US006633348B2

United States Patent
Shohara et al.

(10) Patent No.: US 6,633,348 B2
(45) Date of Patent: Oct. 14, 2003

(54) LIQUID CRYSTAL COMPOSITION, LIQUID CRYSTAL DISPLAY AND METHOD OF MANUFACTURING LIQUID CRYSTAL DISPLAY

(75) Inventors: Kiyoshi Shohara, Saitama (JP); Takeshi Yamamoto, Fukaya (JP); Natsuko Maya, Fukaya (JP); Nobuko Fukuoka, Saitama (JP); Katsuyuki Naito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 91 days.

(21) Appl. No.: 09/961,337

(22) Filed: Sep. 25, 2001

(65) Prior Publication Data

US 2002/0061367 A1 May 23, 2002

(30) Foreign Application Priority Data

Sep. 26, 2000 (JP) ........................................ 2000-291905

(51) Int. Cl.⁷ .......................... G02F 1/13; C09K 19/02; C09K 19/52; C09K 19/54; C09K 19/00
(52) U.S. Cl. ...................... 349/1; 349/182; 252/299.01; 252/299.5; 428/1.1
(58) Field of Search ............... 349/1, 182; 252/299.01, 252/299.5; 428/1.1

(56) References Cited

U.S. PATENT DOCUMENTS

| | | | | |
|---|---|---|---|---|
| 4,892,926 A | * | 1/1990 | Suenaga et al. | 528/305 |
| 4,992,201 A | * | 2/1991 | Pearlman | 252/299.1 |
| 5,238,599 A | * | 8/1993 | Obikawa et al. | 252/299.61 |
| 5,698,134 A | * | 12/1997 | Jubb et al. | 252/299.01 |

* cited by examiner

Primary Examiner—Tarifur R. Chowdhury
(74) Attorney, Agent, or Firm—Pillsbury Winthrop LLP

(57) ABSTRACT

There is provided a liquid crystal display including a first substrate, a second substrate facing the first substrate, and a liquid crystal layer intervening between the first and second substrates and containing liquid crystal substances different from each other, a sum of values each calculated from a formula: $X_\alpha(RT\log P_\alpha + HE_\alpha)$ for all the liquid crystal substances in the liquid crystal layer being 32 kJ/mol or higher, wherein $X_\alpha$ denotes a molar fraction of a component α in the liquid crystal layer, $P_\alpha$ denotes a distribution ratio of the component α between an aqueous phase and a 1-octanol phase, $HE_\alpha$ denotes a hydration energy for 1 mol of the component α, R denotes a gas constant of 8.3 J/K·mol, and T denotes a temperature of 300 K.

14 Claims, 1 Drawing Sheet

LIQUID CRYSTAL COMPOSITION, LIQUID CRYSTAL DISPLAY AND METHOD OF MANUFACTURING LIQUID CRYSTAL DISPLAY

CROSS-REFERENCE TO RELATED APPLICATIONS

This application is based upon and claims the benefit of priority from the prior Japanese Patent Application No. 2000-291905 filed Sep. 26, 2000, the entire contents of which are incorporated herein by reference.

BACKGROUND OF THE INVENTION

1. Field of the Invention

The present invention relates to a liquid crystal composition, a liquid crystal display and a method of manufacturing the liquid crystal display.

2. Description of the Related Art

At present, a general liquid crystal display is manufactured in the following procedure. First, an electrode and an alignment film are successively formed on each of a pair of glass substrates having switching elements, a color filter layer, and the like. Subsequently, these glass substrates are disposed at a constant distance so that the alignment films are disposed opposite to each other, peripheries of the glass substrates excluding a liquid crystal sealing port are fixed with an adhesive, and a liquid crystal cell is formed. Additionally, a gap between the glass substrates is maintained to be constant by spacers. Thereafter, the gap between the liquid crystal cell is filled with a liquid crystal composition to form a liquid crystal layer, and the liquid crystal sealing port is sealed with a sealing material so that the liquid crystal display is obtained.

For the liquid crystal display manufactured by this method, when the liquid crystal layer is contaminated with an impurity, a display property is largely influenced. However, the contamination with the impurity cannot be avoided in the conventional liquid crystal display. Therefore, the conventional liquid crystal display has a problem that display unevenness occurs and reliability is deteriorated.

BRIEF SUMMARY OF THE INVENTION

According to a first aspect of the present invention, there is provided a liquid crystal display comprising a first substrate, a second substrate facing the first substrate, and a liquid crystal layer intervening between the first and second substrates and containing liquid crystal substances different from each other, a sum of values each calculated from a formula:

$$X_\alpha(RT\log P_\alpha + HE_\alpha)$$

for all the liquid crystal substances in the liquid crystal layer being 32 kJ/mol or higher, wherein $X_\alpha$ denotes a molar fraction of a component α in the liquid crystal layer, $P_\alpha$ denotes a distribution ratio of the component α between an aqueous phase and a 1-octanol phase, $HE_\alpha$ denotes a hydration energy for 1 mol of the component α, R denotes a gas constant of 8.3 J/K·mol, and T denotes a temperature of 300 K.

According to a second aspect of the present invention, there is provided a method of manufacturing a liquid crystal display, the display comprising a pair of substrates and a liquid crystal layer intervening between the substrates and containing liquid crystal substances different from each other, comprising determining a composition of the liquid crystal layer based on a sum of values each calculated from a formula:

$$X_\alpha(RT\log P_\alpha + HE_\alpha)$$

for all the liquid crystal substances in the liquid crystal layer, wherein $X_\alpha$ denotes a molar fraction of a component α in the liquid crystal layer, $P_\alpha$ denotes a distribution ratio of the component α, $HE_\alpha$ denotes a hydration energy for 1 mol of the component α, R denotes a gas constant, and T denotes a temperature, and forming a structure comprising the liquid crystal layer intervening between the substrates and having the composition determined.

According to a third aspect of the present invention, there is provided a liquid crystal composition comprising liquid crystal substances different from each other, a sum of values each calculated from a formula:

$$X_\alpha(RT\log P_\alpha + HE_\alpha)$$

for all the liquid crystal substances being 32 kJ/mol or higher, wherein $X_\alpha$ denotes a molar fraction of one component α of the liquid crystal substances in the composition, $P_\alpha$ denotes a distribution ratio of the component α between an aqueous phase and a 1-octanol phase, $HE_\alpha$ denotes a hydration energy for 1 mol of the component α, R denotes a gas constant of 8.3 J/K·mol, and T denotes a temperature of 300 K.

DETAILED DESCRIPTION OF THE INVENTION

Figure 1:
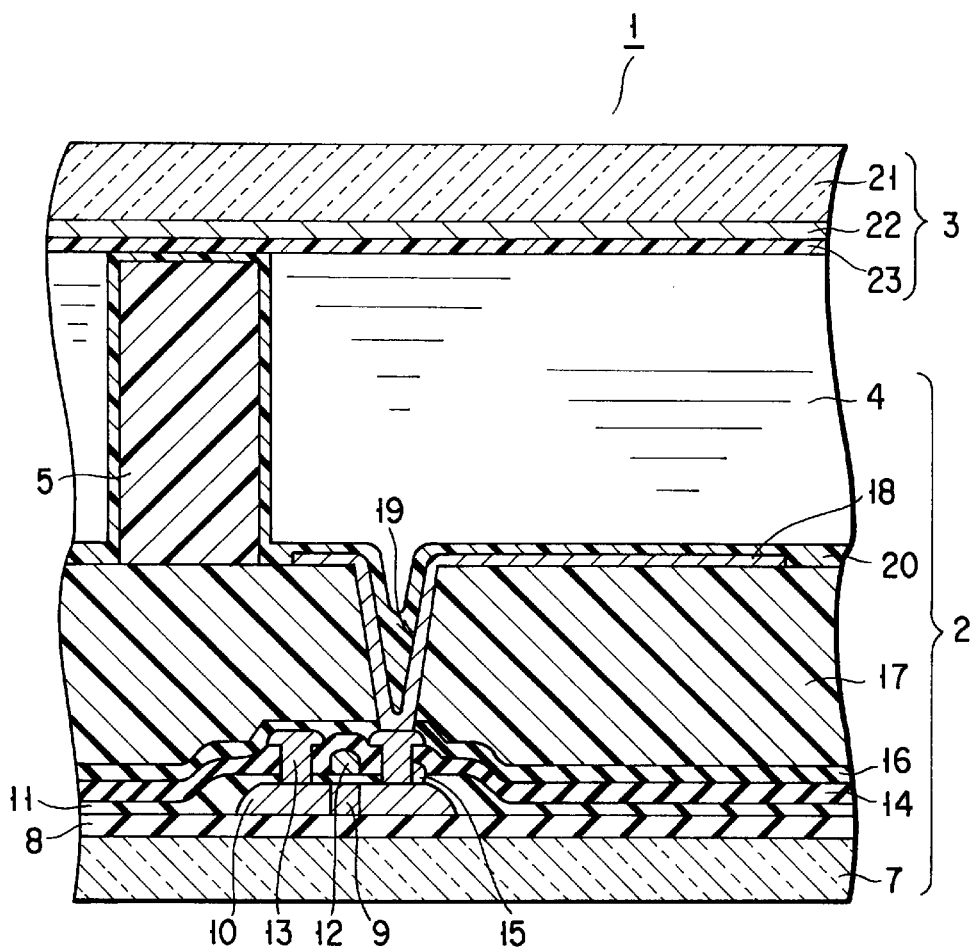
FIG. 1 is a sectional view schematically showing a liquid crystal display according to an embodiment of the present invention.

The present inventors have investigated the reasons for the occurrence of the display unevenness in a conventional liquid crystal display. As a result, the present inventors have found that compounds contained in an adhesive layer, a sealing material, spacers, a peripheral light shielding layer (or a picture-frame layer), a color filter layer, and the like, such as fatty acid, phenyl carboxylic acid, phenyl carboxylic acid derivative, phenylene dicarboxylic acid, phenylene dicarboxylic acid derivative, alkyl amine, phenylenediamine derivative, phenylene amine carboxylic acid, phenylene amine carboxylic acid derivative, and alkyl imide are eluted as impurities into a liquid crystal layer, and then an illuminated defect, an alignment irregularity, and an image persistence are generated. In more detail, when the impurities high in ionicity and/or polarity are eluted into the liquid crystal layer from a member in contact with the liquid crystal layer, an electric resistance value of a liquid crystal composition is lowered (voltage holding ratio is deteriorated). Moreover, the impurities eluted in the liquid crystal layer are adsorbed onto surfaces of alignment films. Therefore, display unevenness such as the illuminated defect, the alignment irregularity, and the image persistence occurs.

The present inventors have paid attention to the fact that mainly a polar impurity generates the display unevenness among the impurities eluted into the liquid crystal layer, have considered that the display unevenness can be inhibited from occurring by realizing a liquid crystal composition not easily causing mixture of the polar impurity, and have intensively researched the composition. As a result, present inventors have found that a value calculated from the following formula (1), which takes account of both hydrophobic and hydrophilic natures, has a remarkably high correlation with the occurrence of the display unevenness.

$$\sum_{\alpha=1}^{n} X_\alpha (R \cdot T \cdot \log P_\alpha + HE_\alpha) \qquad (1)$$

Additionally, in the above formula (1), $X_\alpha$ denotes a molar fraction of a component $\alpha$ in the liquid crystal composition, $P_\alpha$ denotes a distribution ratio of the component $\alpha$, $HE_\alpha$ denotes a hydration energy per mol of the component $\alpha$, R denotes a gas constant, T denotes a temperature, and n denotes the number of all components in the liquid crystal composition.

In the formula (1), the distribution ratio $P_\alpha$ is (whole concentration of the component $\alpha$ in an organic phase)/(whole concentration of the component $\alpha$ in a aqueous phase), and $\log P_\alpha$ as a logarithm of the distribution ratio $P_\alpha$ is a hydrophobic parameter. Moreover, $RT\log P_\alpha$ is proportional to a difference between a free energy of the organic phase containing a unit concentration of the component $\alpha$ at the temperature T and a free energy of the aqueous phase containing a unit concentration of the component $\alpha$ at the temperature T. When the distribution ratio $P_\alpha$, the hydrophobic parameter $\log P_\alpha$, or $RT\log P_\alpha$ is large, the component $\alpha$ is easily dissolved in the organic phase, and the component can therefore be considered to be more hydrophobic.

On the other hand, the hydration energy $HE_\alpha$ is an energy change obtained when one mol of component $\alpha$, the molecules of which does not interact to each other, is infinitely diluted with water. That is, the hydration energy $HE_\alpha$ is equal to a difference between a lattice energy and heat of dissolution (infinite dilution) of the component $\alpha$. When the hydration energy $HE_\alpha$ is small, the component $\alpha$ can be considered to be more hydrophilic.

In this manner, $RT\log P_\alpha$ and $HE_\alpha$ indicate the hydrophobic and hydrophilic natures of the component $\alpha$. When a sum of these values indicates a larger value, the component $\alpha$ can be considered not to easily cause the contamination by the polar impurity. That is, $RT\log P_\alpha + HE_\alpha$ indicates resistance of the component $\alpha$ to contamination by the polar impurity. Therefore, the resistance of the liquid crystal composition to the contamination by the polar impurity can be judged by the value calculated from the formula (1).

In the formula (1), the distribution ratio of the component $\alpha$ between the aqueous phase and the 1-octanol phase can be used as the distribution ratio $P_\alpha$. In this case, a relatively high correlation is realized between the value calculated from the formula (1) and the occurrence of display unevenness. Moreover, in this case, where the gas constant R and the temperature T are assumed to be 8.3 J/K·mol (2 cal/K·mol) and 300 K, respectively, the display unevenness can be inhibited from occurring by setting the composition of the liquid crystal composition such that the value calculated from the formula (1) is 32 kJ/mol (7.7 kcal/mol) or more, preferably 33.2 kJ/mol (8 kcal/mol) or more. Additionally, most of the liquid crystal substances whose value of $RT\log P_\alpha + HE_\alpha$ is large are fluorine-based liquid crystal substances. In general, when a content of such a liquid crystal substance is large, a driving voltage tends to increase or a response speed tends to decrease. Therefore, the value calculated from the formula (1) is preferably 45.7 kJ/mol (11 kcal/mol) or less. It is noted that the relation between the value and the effect hardly depends on the size of the liquid crystal display, etc.

For the distribution ratio or the logarithm of the ratio, found values are obtained with respect to many compounds, and experimental parameters are sufficiently set. Moreover, it is known that the found values agree with calculated values with a very high precision. Therefore, the distribution ratio $P_\alpha$ of the component $\alpha$ for use in the formula (1) can be obtained by calculation. Furthermore, the hydration energy $HE_\alpha$ per mol of the component $\alpha$ can similarly be obtained by the calculation.

The calculation is usually performed with respect to a liquid crystal molecule which has a most stable conformation. That is, it is necessary to determine the most stable conformation of the liquid crystal molecule before the calculation of the distribution ratio $P_\alpha$ and hydration energy $HE_\alpha$.

However, many liquid crystal molecules have not only a functional group which can be considered as a rigid body such as an aryl group but also a long-chain alkyl group which can constitute various conformations. Additionally, the liquid crystal composition can contain a large number of liquid crystal molecules, and can additionally contain molecules other than the liquid crystal molecules. Therefore, it usually requires much time and labor to determine the most stable conformation and calculate the distribution ratio $P_\alpha$ and hydration energy $HE_\alpha$ based on the conformation with respect to the respective molecules constituting the liquid crystal composition.

The present inventors have studied in order to obtain a criteria which can be calculated in a simpler method and has a high correlation with the occurrence of display unevenness. As a result, the present inventors have found that a result similar to the aforementioned result can be obtained by a method in which the most stable conformation of the liquid crystal molecule is determined on regarding the alkyl group having two or more carbon atoms as a normal pentyl group, the distribution ratio $P_\alpha$ and hydration energy $HE_\alpha$ are calculated based on the conformation, the liquid crystal composition is assumed to be constituted only of the liquid crystal molecules, and the formula (1) is utilized.

According to the method, the liquid crystal molecules which differ from each other only in the number of carbon atoms of the alkyl group are handled as the same liquid crystal molecule. Therefore, types of molecules as objects of the calculation decrease. Moreover, since all the alkyl groups each having two or more carbon atoms are regarded as the normal pentyl groups, it is easy to determine the most stable conformation of the liquid crystal molecule.

Additionally, when the liquid crystal molecules differ from each other in the number of carbon atoms of the alkyl group, the molecules are considered to also differ from each other in the hydrophilic and hydrophobic natures. However, in many cases, the alkyl group having two or more carbon atoms contained in the liquid crystal molecule has about three to seven carbon atoms. Even when the alkyl group having two or more carbon atoms is regarded as the normal pentyl group, a large difference is not generated in a calculation result.

An example of the present invention will be described hereinafter with reference to the drawings. Additionally, similar constituting members in respective drawings are denoted with the same reference numerals, and redundant description is omitted.

First, $\log P_\alpha$, $HE_\alpha$, and $RT\log P_\alpha + HE_\alpha$ were calculated by the following method with respect to plural types of liquid crystal substances having the normal pentyl group as shown in the following Table 1. That is, the hydrophobic parameter $\log P_\alpha$ and hydration energy $HE_\alpha$ of the liquid crystal substance α were calculated by HyperChem v5 manufactured by Hypercube Co. with a personal computer PV300 manufactured by Toshiba Corp. Concretely, first, molecular force field calculation (MM+) was used to obtain the most stable conformation of the liquid crystal molecule, and the hydrophobic parameter $\log P_\alpha$ and hydration energy $HE_\alpha$ were calculated by experiential quantitative structure-activity relationships (QSAR) program with respect to the liquid crystal molecules of the conformation. Additionally, the distribution ratio $P_\alpha$ was regarded as the distribution ratio of the liquid crystal substance α between the aqueous phase and the 1-octanol phase. Results are also shown in Table 1.

TABLE 1

| Structure of liquid crystal molecule | log P | HE (kcal/mol) | RTlogP + HE (kcal/mol) |
|---|---|---|---|
| 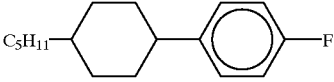 | 5.98 | 2.39 | 5.98 |
| 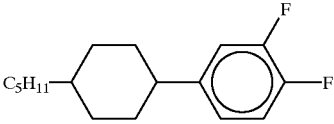 | 6.12 | 2.63 | 9.66 |
| 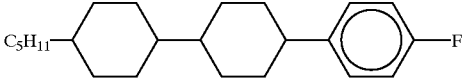 | 7.72 | 3.02 | 7.65 |
| 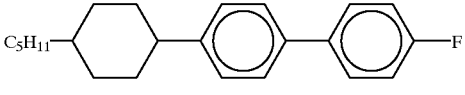 | 7.67 | 1.55 | 6.15 |
| 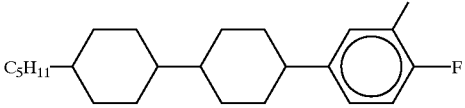 | 7.86 | 3.24 | 7.96 |
| 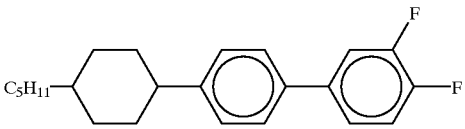 | 7.8 | 1.81 | 6.49 |
| 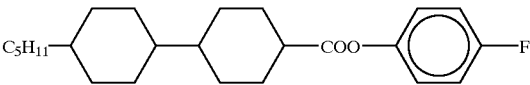 | 7.5 | 1.11 | 5.61 |
| 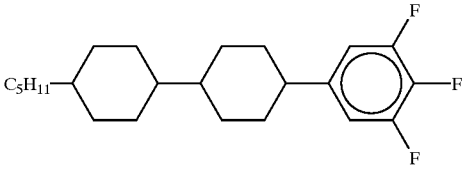 | 8.0 | 3.44 | 8.24 |
| 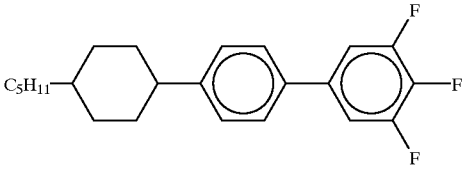 | 7.94 | 2.06 | 6.82 |

TABLE 1-continued

| Structure of liquid crystal molecule | log P | HE (kcal/mol) | RTlogP + HE (kcal/mol) |
|---|---|---|---|
| $C_5H_{11}$—⬡—⬡—⬡—⌬(F,F,F) | 9.74 | 4.49 | 10.3 |
| $C_5H_{11}$—⬡—⬡—◯—⌬(F,F,F) | 9.69 | 2.55 | 8.36 |

As shown in Table 1, in an ester-based liquid crystal, logP has a large value, but HE has a small value, and RTlogP+HE has a relatively small value. On the other hand, in a direct annular p-type liquid crystal, with a larger number of rings, RTlogP+HE has a large value, and the contamination of the polar impurity can more effectively be suppressed.

Figure 2:
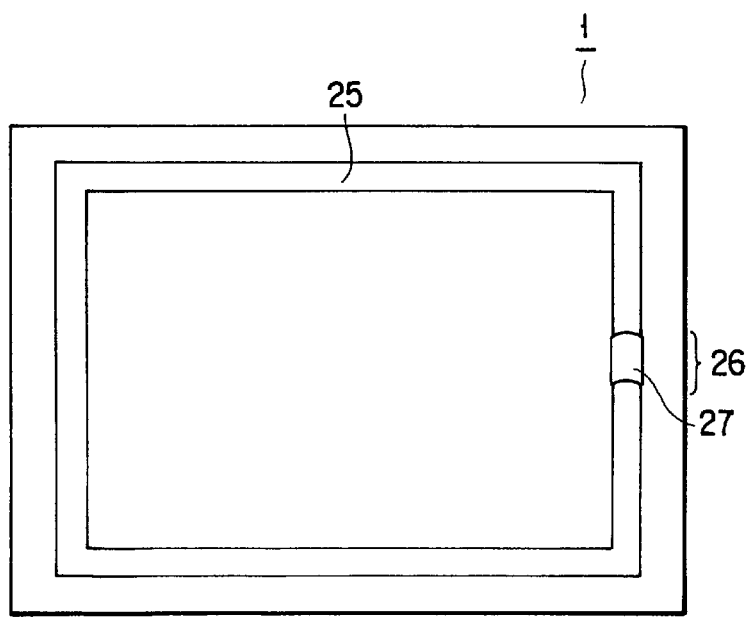
FIG. 2 is a schematic plan view of the liquid crystal display shown in FIG. 1.

A liquid crystal display shown in FIGS. 1 and 2 was next used to check a relationship between the value calculated from the formula (1) and the display unevenness. Additionally, FIG. 1 is a partial sectional view schematically showing the liquid crystal display according to an embodiment of the present invention. Moreover, FIG. 2 is a plan view of the liquid crystal display shown in FIG. 1. First, a structure of the liquid crystal display shown in FIGS. 1 and 2 will be described.

A liquid crystal display 1 shown in FIGS. 1 and 2 is a TN-type liquid crystal display which can perform color display, and has a structure in which a liquid crystal layer 4 is held between an active matrix substrate 2 and an opposite substrate 3. A gap between the active matrix substrate 2 and opposite substrate 3 is maintained to be constant by a columnar spacer 5 formed on the active matrix substrate 2. Moreover, an adhesive layer 25 is disposed in a peripheral edge between the substrates 2 and 3 except an injection port 26 for injecting a liquid crystal substance between the substrates 2 and 3, and a sealing material 27 is used to seal the injection port 26. Additionally, the liquid crystal display 1 shown in FIGS. 1 and 2 is usually sandwiched between a pair of polarizers, and a light source is disposed on a back surface side.

The active matrix substrate 2 has a transparent substrate 7 such as a glass substrate, and coplanar type polysilicon TFT is formed on one main surface of the transparent substrate 7. That is, an undercoating layer 8 having a two-layer structure of a silicon oxide film and silicon nitride film is formed on one main surface of the transparent substrate 7. A semiconductor active layer (channel) 9 and high-concentration impurity regions 10 as source/drain are formed on the undercoating layer 8, and a gate oxide film 11 is formed to cover the layer and the regions. Furthermore, a gate electrode 12 is formed on the gate insulating film 11. Additionally, a scanning line (not shown) is formed in the same process as a process for forming the gate electrode 12.

A signal line 13 having a two-layer structure of Mo and Al layers is formed on the scanning line and gate insulating film 11. The signal line 13 is connected to the high-concentration impurity region 10 via a contact hole 15 formed through the gate insulating film 11 and an interlayer insulating film 14.

An inorganic insulating film 16 having a two-layer structure of a silicon oxide film and silicon nitride film and a color filter layer 17 are successively laminated on the signal line 13 and interlayer insulating film 14. The color filter layer 17 has a stripe pattern of three colors of red, blue and green, which is formed by adding a color material to a resin.

A pixel electrode 18 made of indium thin oxide (ITO) or another transparent conductive material is formed on the color filter layer 17. The pixel electrode 18 is electrically connected to TFT via a contact hole 19 formed in the color filter layer 17. Moreover, the columnar spacer 5 and a peripheral edge shield layer (not shown) are formed on the color filter layer 17. An alignment film 20 of polyimide or the like is formed on the pixel electrode 18 and columnar spacer 5.

The opposite substrate 3 has a structure in which a common electrode 22 and alignment film 23 are successively formed on the surface of a transparent substrate 21 disposed opposite to the active matrix substrate 2. A voltage can be applied to the common electrode 22 from the active matrix substrate 2 via an electrode transfer material (not shown) made of a silver paste or the like on a screen peripheral portion.

In the present example, the liquid crystal display 1 having a structure as described above was prepared by the following method. First, the glass substrate 2 with TFT, etc. formed on one main surface thereof was prepared. Subsequently, a coating liquid for forming red coloring layers was applied to the surface of the glass substrate 2 with TFT formed thereon. Next, a coating film obtained by the application of the coating liquid onto the transparent substrate 2 was patterned using photolithography and etching techniques. The film was patterned so that portions of the coating film corresponding to a red color regions of the color filter layer 17 were left and the contact holes 19 were formed. The red coloring layers were obtained in this manner. Green and blue coloring layers were successively formed by a similar process. Thereby, the 3 μm thick color filter layer 17 having striped coloring layers of three colors of red, blue and green was obtained. Additionally, these coloring layers were formed using ultraviolet hardening acrylic resins CG-2000, CR-2000, and CB-2000 manufactured by Fuji Film Ourin Co. as the coating liquid.

Next, a 100 nm thick ITO film was formed on the surface of the glass substrate 2 with the color filter layer 17 formed thereon by a sputtering process, and the ITO film was patterned to obtain the pixel electrodes 18.

Thereafter, a predetermined coating liquid was applied to the surface of the transparent substrate 2 with the pixel electrodes 18 formed thereon. Here, an ultraviolet hardening acrylic resin CK-2000 containing a black pigment (manufactured by Fuji Hunt Technology Co.) was used as the coating liquid. Subsequently, the obtained coating film was patterned using the photolithography and etching techniques so that the columnar spacers 5 and peripheral light shielding layer were formed.

Subsequently, AL-1051 as polyimide manufactured by JSR Co. was used to form a thin film on the surface of the glass substrate 2 with the columnar spacers 5 and peripheral light shielding layer formed thereon, and the thin film was subjected to a rubbing treatment so that the alignment film 20 was obtained. The active matrix substrate 2 was completed as described above.

While the active matrix substrate 2 was prepared in the aforementioned method, the common electrode 22 of 100 nm thick ITO film was formed on one main surface of the glass substrate 21 and the opposite substrate 3 was prepared. The alignment film 23 was also formed on the common electrode 22 by a method similar to the aforementioned method.

Next, a thermosetting epoxy-based adhesive ES-5500 (manufactured by Mitsui Toatsu Chemicals, Inc.) was used as the adhesive 25 to attach the active matrix substrate 2 and opposite substrate 3 to each other and a liquid crystal cell was formed. Subsequently, the gap between the liquid crystal cell was filled with a predetermined liquid crystal composition via the injection port 26, and the sealing material 27 was used to seal the injection port. The liquid crystal display 1 shown in FIGS. 1 and 2 was obtained as described above.

A plurality of liquid crystal displays 1 different from each other in a type of the liquid crystal composition were prepared in the aforementioned method, and the value was obtained by calculation from the formula (1) with respect to each of the liquid crystal compositions LC1 to LC6. Additionally, as the hydrophobic parameter $\log P_\alpha$ and hydration energy $HE_\alpha$, the value calculated by a method similar to the aforementioned method in which the alkyl group having two or more carbon atoms is regarded as the normal pentyl group was used, and the value shown in Table 1 was also utilized. Moreover, it was assumed that the gas constant R was 2 cal/K·mol, the temperature T was 300 K, and the liquid crystal compositions LC1 to LC6 were constituted only by the liquid crystal molecules. Results are shown in the following Table 2.

Furthermore, a continuous lighting test was carried out for 1000 hours under a high-temperature high-humidity condition of 60° C./80% with respect to the liquid crystal display 1 prepared by the aforementioned method. The results are also shown in Table 2.

TABLE 2

| Liquid crystal composition | $\Sigma X_\alpha(RT\log P_\alpha + HE_\alpha)$ (kcal/mol) | Display unevenness |
|---|---|---|
| LC1 | 8.2 | Not occurred |
| LC2 | 8.0 | Occurred after 800 h |
| LC3 | 7.7 | Occurred after 500 h |
| LC4 | 7.6 | Occurred after 200 h |
| LC5 | 7.2 | Occurred after 24 h |
| LC6 | 7.0 | Occurred at initial stage |

TABLE 2-continued

As shown in the above Table 2, in the liquid crystal display 1 using the liquid crystal compositions LC1 to LC3 in which the value calculated from the formula (1) was 7.7 kcal/mol or more, display unevenness did not occur even after 300 hours. It was confirmed that the display had a practically sufficient resistance.

Additionally, in the example, when the value was obtained by the calculation from the formula (1), the calculation was simplified by regarding the alkyl group having two or more carbon atoms as the normal pentyl group. However, even when such simplification is not performed, the result can be obtained similarly as described above. Moreover, the hydrophobic parameter $\log P_\alpha$ shown in Table 1 was obtained using the distribution ratio $P_\alpha$ of the liquid crystal substance α between the aqueous phase and the 1-octanol phase. However, the hydrophobic parameter $\log P_\alpha$ may be obtained using the distribution ratio $P_\alpha$ between the aqueous phase and another organic phase.

Furthermore, the liquid crystal display 1 structured as shown in FIGS. 1 and 2 has been described in the above example, but another structure may also be employed. For example, in the example, the coplanar polysilicon TFT was used as a switching element, but another TFT may also be used. Alternatively, color dot matrix display can also be performed by simple matrix driving. That is, a Y substrate having Y electrodes each patterned in a band shape in a lateral (Y) direction on one main surface, and an X substrate having the color filter layer and X electrodes each patterned in the band shape in a longitudinal (X) direction successively laminated on one surface are disposed opposite to each other so that the Y electrodes substantially cross at right angles to the X electrodes, and the liquid crystal layer 4 is held between the substrates. This structure may also be employed. Furthermore, in the example, the TN type liquid crystal display 1 has been described, but examples of a display type may include an STN type, GH type, ECB type, and a type in which a ferroelectric liquid crystal is utilized.

Moreover, in the example, after the pixel electrode 18 was formed, the columnar spacers 5 and peripheral light shielding layer were formed. However, after the columnar spacers 5 and peripheral light shielding layer are formed, the pixel electrode 18 may be formed. Furthermore, the columnar spacers 5 and peripheral light shielding layer were simultaneously formed in the aforementioned method, but may also be formed in separate processes. Additionally, the columnar spacers 5 and peripheral light shielding layer were formed on the active matrix substrate 2 in the aforementioned method, but may also be formed on the opposite substrate 3. Alternatively, while one of the columnar spacers 5 and the peripheral light shielding layer is formed on the active matrix substrate 2, and the other may be formed on the opposite substrate 3.

Moreover, in the example, a black-color photosensitive composition was used to form both of the columnar spacers 5 and peripheral light shielding layer, but may also be used to form only one thereof. Furthermore, the columnar spacers 5 may not have a shielding property in the liquid crystal display 1. Additionally, plastic beads or another grain spacers may also be used instead of the columnar spacers 5.

As described above, in the present invention, the composition of the liquid crystal composition is set based on the value calculated from the predetermined formula in which both the hydrophobic and hydrophilic natures of the liquid crystal composition are considered. Therefore, the liquid crystal composition which cannot easily be contaminated by the polar impurity can be realized, and the display unevenness can therefore be inhibited from occurring.

That is, according to the present invention, there are provided a liquid crystal composition which can realize a liquid crystal display in which the display unevenness does not easily occur and which has a high reliability, such a liquid crystal display, and a manufacturing method of such a liquid crystal display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A liquid crystal display comprising:
   a first substrate;
   a second substrate facing the first substrate; and
   a liquid crystal layer intervening between the first and second substrates and containing liquid crystal substances different from each other, a sum of values each calculated from a formula:

$$X\alpha(RT\log P\alpha + HE\alpha)$$

for all the liquid crystal substances in the liquid crystal layer being 32 kJ/mol or higher, wherein $X\alpha$ denotes a molar fraction of one component $\alpha$ of the liquid crystal substances in the liquid crystal layer, $P\alpha$ denotes a distribution ratio of the component $\alpha$ between an aqueous phase and a 1-octanol phase, $HE\alpha$ denotes a hydration energy for 1 mol of the component $\alpha$, R denotes a gas constant of 8.3 J/K·mol, and T denotes a temperature of 300 K.

2. The display according to claim 1, wherein the first substrate comprises a color filter layer facing the second substrate, and pixel electrodes between the color filter layer and the liquid crystal layer.

3. The display according to claim 1,
   wherein the first substrate comprises pixel electrodes facing the second substrate, switching elements electrically connected to the pixel electrodes, signal lines electrically connected to the switching elements, and scanning lines crossing the signal lines,
   wherein the second substrate comprises a common electrode facing the first substrate, and
   wherein either one of the first and second substrates further comprises a color filter layer facing another of the first and second substrates.

4. The display according to claim 1, wherein the sum is 33.2 kJ/mol or higher.

5. The display according to claim 1, wherein the sum is 45.7 kJ/mol or higher.

6. The display according to claim 1, wherein at least one of the liquid crystal substances comprises an alkyl group which includes at least two carbon atoms, and wherein the distribution ratio $P\alpha$ and the hydration energy $HE\alpha$ of the liquid crystal substance which comprises the alkyl group are obtained supposing that the alkyl group is an n-pentyl group.

7. A method of manufacturing a liquid crystal display, the display comprising a pair of substrates and a liquid crystal layer intervening between the substrates and containing liquid crystal substances different from each other, comprising:

determining a composition of the liquid crystal layer based on a sum of values each calculated from a formula:

$$X\alpha(RT\log P\alpha + HE\alpha)$$

for all components in the liquid crystal layer, wherein $X\alpha$ denotes a molar fraction of a component $\alpha$ in the liquid crystal layer, $P\alpha$ denotes a distribution ratio of the component $\alpha$, $HE\alpha$ denotes a hydration energy for 1 mol of the component $\alpha$, R denotes a gas constant, and T denotes a temperature; and forming a structure comprising the liquid crystal layer intervening between the substrates and having the composition determined, wherein determination of the composition is carried out to make the sum be 32 kJ/mol or higher under a condition where the distribution ratio $P\alpha$ is a distribution ratio of the component $\alpha$ between an aqueous phase and a 1-octanol phase, the gas constant R is 0.3 J/K·mol, and the temperature T is 300 K.

8. The method according to claim 7, wherein the determination of the composition is carried out to make the sum be 32.2 kJ/mol or higher under a condition where the distribution ratio $P\alpha$ is a distribution ratio of the component $\alpha$ between an aqueous phase and a 1-octanol phase, the gas constant R is 8.3 J/K·mol, and the temperature T is 300 K.

9. The method according to claim 7, wherein the determination of the composition is carried out to make the sum be 45.7 kJ/mol or higher under a condition where the distribution ratio $P\alpha$ is a distribution ratio of the component $\alpha$ between an aqueous phase and a 1-octanol phase, the gas constant R is 8.3 J/K·mol, and the temperature T is 300 K.

10. The method according to claim 7, wherein at least one of the liquid crystal substances comprises an alkyl group which includes at least two carbon atoms, and wherein the distribution ratio $P\alpha$ and the hydration energy $HE\alpha$ of the liquid crystal substance which comprises the alkyl group are obtained supposing that the alkyl group is an n-pentyl group.

11. A liquid crystal composition comprising liquid crystal substances different from each other, a sum of values each calculated from a formula:

$$X\alpha(RT\log P\alpha + HE\alpha)$$

for all the liquid crystal substances being 32 kJ/mol or higher, wherein $X\alpha$ denotes a molar fraction of one component $\alpha$ of the liquid crystal substances in the composition, $P\alpha$ denotes a distribution ratio of the component $\alpha$ between an aqueous phase and a 1-octanol phase, $HE\alpha$ denotes a hydration energy for 1 mol of the component $\alpha$, R denotes a gas constant of 8.3 J/K·mol, and T denotes a temperature of 300 K.

12. The composition according to claim 11, wherein the sum is 33.2 kJ/mol or higher.

13. The composition according to claim 11, wherein the sum is 45.7 kJ/mol or higher.

14. The composition according to claim 11, wherein at least one of the liquid crystal substances comprises an alkyl group which includes at least two carbon atoms, and wherein the distribution ratio $P\alpha$ and the hydration energy $HE\alpha$ of the liquid crystal substance which comprises the alkyl group are obtained supposing that the alkyl group is an n-pentyl group.

* * * * *